April 16, 1963 J. H. O. HARRIES 3,086,076

COLOR INDEX TUBE PROJECTION SYSTEM

Filed May 19, 1959 2 Sheets-Sheet 1

Inventor
John Henry Owen Harries
By Ralph B. Stewart
Attorney

COLOR INDEX TUBE PROJECTION SYSTEM

Filed May 19, 1959

Inventor
John Henry Owen Harries
By Ralph B. Stewart
Attorney

United States Patent Office 3,086,076
Patented Apr. 16, 1963

3,086,076
COLOR INDEX TUBE PROJECTION SYSTEM

John Henry Owen Harries, Warwick, Bermuda, assignor to Harries Electronics Corporation Limited Filed May 19, 1959, Ser. No. 814,207
Claims priority, application Great Britain May 28, 1958
12 Claims. (Cl. 178—5.4)

This invention relates to colour television display systems, within which are included radar or other display systems in which a multi-colour image may be produced on the phosphor screen of a cathode ray tube.

In colour television display system of the kind employing a cathode ray tube having a phosphor screen consisting of a plurality of elemental area (which expression includes strips of elemental width) constituting different sets of areas coated respectively with phosphors adapted to radiate at different wavelengths, it is necessary to provide colour selection which ensures that an electron beam is modulated by a signal from the appropriate colour channel when it strikes a phosphor element of the corresponding colour on the screen of the cathode ray tube, i.e., a phosphor element which will radiate light of the appropriate colour. Prior proposals to attain this end have either been ineffective or very complicated and costly. It is an object of the present invention to provide a practical and yet simple receiving system which includes means which ensure that this relationship is always present.

According to the invention a colour television display system of this kind comprises radiation-sensitive means, sensitive only over a limited spectral range, including the visible wavelength radiated by a given set of phosphor-coated areas to produce corresponding electric signals when such areas are scanned, and arranged to receive such radiation only from the phosphor screen. In addition, means are provided for ensuring that the phosphor screen continues to be scanned by an electron beam in the absence of the video signal. Switching means operate under the control of the said electric signals and serve to switch colour-component video signals one at a time to the modulation electrode of the tube as the corresponding phosphor areas are scanned in turn by the electron beam, and the apparatus also includes an optical projection system adapted to form a magnified image of the display on the phosphor screen on a diffusing screen. The magnification of the optical system is made such that the effect of ambient radiation at the diffusing viewing screen on the radiation-sensitive means is negligible, although if the radiation-sensitive means is sensitive only to non-visible radiation produced by one of the phosphors, the effect of ambient radiation of this non-visible wavelength at the diffusing screen may be further reduced by means of a filter adapted to reduce the transmission of such radiation, placed in the optical path between the phosphor screen and the diffusing viewing screen. Assuming the radiation-sensitive means to be sensitive only to red light (for example, to consist of a photoelectric cell and a red colour filter), the apparatus according to the invention ensures that when the electron beam strikes a red phosphor area the modulating signal which is applied to the tube will be from the red colour channel.

To ensure that the electron beam will be similarly controlled when it strikes phosphor areas of other colours, separate radiation-sensitive devices can be used, if desired, for each of the phosphor colours, the signals from these radiation-sensitive devices controlling switching or gating means in the corresponding colour channels. Thus, when the electron beam is deflected from the red phosphor area to a blue or green phosphor area, the modulating electrode of the electron discharge tube will be switched from the red colour channel to the blue or green colour channel. In an alternative embodiment, however, only a single radiation-sensitive device is used the output of this device being used to control the successive application of the colour channel signals to the modulation electrode of the tube, with a suitable delay between the switching of the different colour channels. A delay line of known form can be used to achieve this.

Each radiation-sensitive device may consist of a light-sensitive device and a colour filter, or by a light-sensitive device the spectral sensitivity range of which is suitably limited without the use of a filter. If the light-sensitive devices were operated by light received directly from the viewing screen, instead of by light received exclusively from the phosphor screen, then a comparatively large amount of any ambient light falling on the viewing screen would be received by the light-sensitive devices. This would make the system unworkable for use under ordinary conditions of ambient illumination because this illumination would tend to trigger all three colour channels simultaneously. However, we have discovered that if an optical projection system is used having a considerable magnification, say 20 to 30 (though a smaller magnification may be sufficient in many instances) and if the photocells are arranged to receive light exclusively from the phosphor and not directly from the viewing screen, then any ordinary amount of ambient illumination which may fall upon the viewing screen does not affect the operation of the light-sensitive devices. This desirable result can be explained by calculating the effects of the diffusion of light by the viewing screen and by the surface of the phosphor. As a result of this diffusion, the value of the ratio between the intensity of the ambient illumination and the intensity of the illumination due to the picture itself at the viewing screen is reduced at the phosphor by a factor at least as great as the square of the magnification of the optical system. Because, in a typical instance, the optical magnification may be as much as 30, giving a value of 900 for the square of the magnification, the light-sensitive devices, which receive light only from the phosphor and not directly from the viewing screen, are not affected by any ordinary level of ambient illumination which may fall on the viewing screen. The expression "considerable magnification" which is used above is, therefore, intended to indicate that the magnification of the optical system is sufficiently great for its square to be enough to reduce the effect of ordinary ambient illumination upon the light-sensitive devices to a negligible amount.

It should be noted that the light-sensitive device responds to ambient light falling on the screen only after reflection from the screen to the phosphor surface and then by reflection from the phosphor to the light-sensitive device. Since both reflecting surfaces are diffusing in character the amount of ambient light reaching the light-sensitive device is very small.

One means for assuring that the phosphor screen continues to be scanned by an electron beam in the absence of a video signal consists in applying an appropriate biasing potential to the modulating electrode of the tube so that the electron beam current is not completely cut off when the video signal is absent. Alternatively, an electron gun may be provided which has a subsidiary electron beam which is not controlled by the potentials on the modulator electrode.

The reason for ensuring that the electron beam is never completely cut off is that it is that it is essential for each phosphor element in turn to provide some light during the scanning of the screen in order to enable the corresponding light-sensitive devices to generate the colour-control signals which control the timing of the application of the colour channel signals to the modulation electrode of the tube. Because the light-sensitive devices are close to the phosphor and are operated by light emanating directly from the phosphor, and because, as explained above, the illumination of the phosphor by ambient light falling on the viewing screen is relatively small, this constant minimum level of beam intensity can be arranged to be of two low a level to make any substantial difference to the picture contrast whilst at the same time being sufficient to operate the light-sensitive devices.

The above discussion has refererd to the operation of light-sensitive devices by visible light from the phosphor screen, but alternatively non-visible radiation can be used to trigger a device sensitive to the appropriate wavelength. The non-visible radiation may be generated by one of the colour-producing phosphors, or a separate set of phosphor areas may be provided on the screen to provide non-visible radiation to which the device is sensitive.

A simple and effective method of colour selection and reception is thus obtained.

In order that the invention may be better understood several embodiments thereof will now be described with reference to the accompanying drawings, in which.

Figures 1, 2:
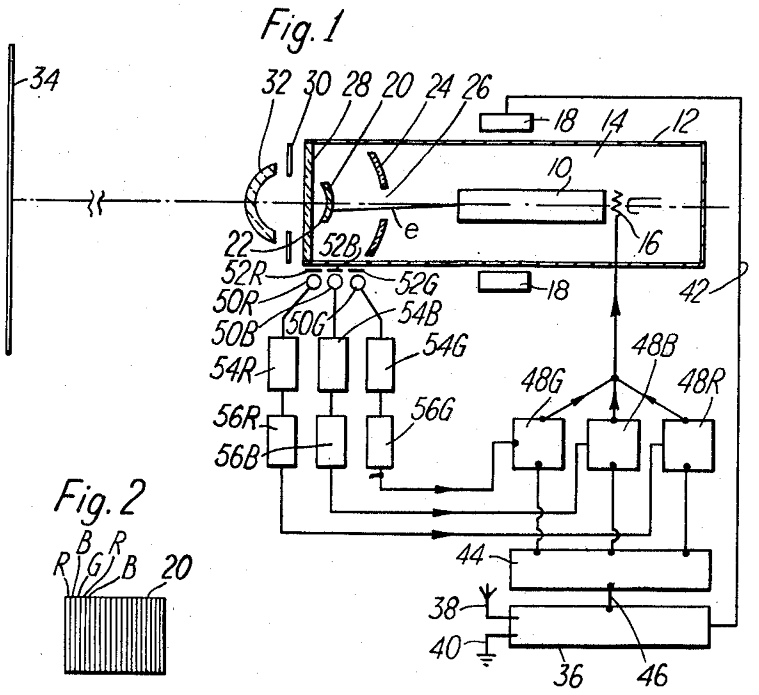
FIGURE 1 shows diagrammatically a television receiving system embodying the present invention.
FIGURE 2 shows the arrangement of phosphor strips on the phosphor screen of the television receiver shown in FIGURE 1.

FIGURE 1 of the drawing shows diagrammatically a television receiving system in accordance with the invention. The electron gun 10 produces an electron beam *e* in the vacuum envelope 12 of a discharge tube 14. The intensity of the electron beam is controlled by video potentials applied to the control grid 16. Suitable electric signals are applied to deflection plates or coils represented in FIGURE 1 by the blocks 18, to cause the beam to scan over a phosphor screen 20, which is supported on a backing 22, in two mutually perpendicular directions to form a conventional scanning raster. A diagrammatic view of this phosphor screen 20, as seen from the electron gun, is shown in FIGURE 2. The red, blue and green phosphors are deposited on the backing 22 in a succession of adjacent parallel strips R, B and G, the red, blue and green strips recurring cyclically from one side of the screen to the other, as shown in FIGURE 2. The number of parallel strips has been greatly reduced in FIGURE 2 for the sake of clarity. The fastest direction of scanning by the electron beam (line scan) is arranged to be transverse to the strips. The colour strips may be spaced slightly and the diameter of the electron beam *e* may then be made such that it strikes only one colour strip at a time, or overlaps the colour strips only slightly.

An image of the raster on the phosphor screen 20, is projected on to a diffusing viewing screen (which may be either of the front or rear projection type) by means of a mirror type projection system. This projection system consists of the spherical concave mirror 24 which is located within the vacuum tube and projects the image on the phosphor screen through a glass window 28 in the wall of the envelope of the vacuum tube and through an optical stop 30 and glass corrector meniscus 32 on to a viewing screen 34. An optical projection system of this kind is described and claimed in our co-pending patent application Ser. No. 780,421 now Patent No. 2,960,615. The projection system may, in addition, utilise the distortion-correction device described and claimed in our co-pending application No. 814,206, now Patent No. 2,999,-126 to reduce the effects of keystone distortion in oblique projection systems, or of pincushion or barrel distortion.

The circuits which control the tube 14 will now be briefly described. The block 36 in FIGURE 1 represents a colour television receiver, with an antenna 38 and ground 40, which derives red, blue and green video signals from the incoming signal received by the antenna 38. Line and frame scanning potentials or currents are supplied by means of the link 42 to the deflection coils or plates 18. The block 44 represents a video amplifier fed from the receiver 36 through the link 46. Amplified red, blue and green video signals are applied to the gate circuits 48R, 48B and 48G, which are operated successively by gating signals so that the red, blue and green video signals are applied in cyclic succession to the control grid 16 of the discharge tube. The gating signals are produced by photosensitive devices 50R, 50B and 50G, which are exposed to the phosphor screen through red, blue and green colour filters 52R, 52B and 52G respectively, each photosensitive device and colour filter constituting in combination a device sensitive to radiation only over a limited spectral range. Bias potentials applied to the control grid 16 of the tube ensure that even in the absence of video signals the electron beam is not completely cut off so that enough light will still be received by the photosensitive devices to ensure the production of satisfactory gating signals. The gating signals from the photosensitive devices are passed respectively through the three amplifiers 54R, 54B and 54G and are preferably clipped at both the top and bottom by the limiter circuits 56R, 56B and 56G.

In order to ensure that as far as possible the photosensitive devices receive only light from the phosphor screen, they are shielded from direct ambient light. Thus, the only ambient light which they receive is that which is diffused from the viewing screen, passes back through the optical projection system to the phosphor screen 20, and is then diffused again from that screen. For the reasons given above, for ordinary levels of ambient illumination of the viewing screen, the intensity of ambient light which reaches and is diffused from the phosphor screen is extremely small in relation to the intensity of the light radiated from the phosphor itself, and the operation of the photosensitive devices 50R, 50B and 50G is therefore unaffected by the ambient illumination of the viewing screen. The magnification of the optical system may conveniently be greater than 20, for example between 20 and 30, but adequate freedom from the effects of ambient illumination may often be obtained with smaller values of magnification than this. Thus, in cases of low ambient illumination at the viewing screen, a magnification of 5 might be sufficient. The clipping of the signals from the photosensitive devices by the limiters 56R, 56B and 56G is arranged to remove the tops of the waveforms in order to prevent the passage to the gates 48R, 48B and 48G of that part of each signal which is due to the picture content modulation of the electron beam *e*; and to remove the bottom of the waveforms in order to ensure firstly, that the gates are not operated by small signals generated by excessive ambient illumination; and secondly, that the gate in any given colour channel is not operated by small signals generated by the corresponding photosensitive device when the electron beam is scanning a phosphor strip of a different colour, which small signals might be caused, for example, by the electron beam overlapping on to the adjacent phosphor strip, or, by any overlap of parts of the spectral response curves of the photosensitive devices or colour filters used with them. Because the photosensitive devices are close to the phosphor screen they will produce adequate gating signals even though considerable top and bottom clipping is used. Preferably the size of the electron beam *e* where it strikes the phosphor strips on the phosphor 20 (FIGURE 2) is small so that the overlap when the beam passes from one phosphor strip to the next is reduced as much as possible. Spaces can be provided between the phosphor strips to assist in achieving this result, and these spaces should preferably be coated with a substance capable of reducing secondary electron emission.

The video amplifier 44 supplies continuous green video signals to the gate 48G, continuous blue video signals to the gate 48B and continuous red video signals to the gate 48R. When the electron beam is, for example, moving across a red phosphor strip R (FIGURE 2) red light from the phosphor is received by the photosensitive device 50R through the red colour filter 52R. The resulting gating pulse from the photosensitive device 50R travels through the amplifier 54R and limiter 56R to the gate 48R and opens this gate to cause the red video signal to be applied to the control grid 16 and in this way to modulate the electron beam *e*. Whilst the electron beam *e* is on the red strip the green and blue gates 48G and 48B are closed and do not transmit video signals to the control grid 16. When the electron beam *e* moves off the red strip R on the phosphor 20 and on to the adjacent blue strip B the red gating pulse applied to the gate 48R ceases to exist and this gate closes. The blue light from the phosphor 20 is received by the photosensitive device 50B through the blue filter 52B and transmits a blue gating pulse through the amplifier 54B and limiter 56B to the blue gate 48B which is thereby opened so that the blue video signal is then transmitted to the control grid 16. The green gate 48G is still closed. When the electron beam *e* moves off the blue phosphor strip B on to the green phosphor strip G the blue gate 48B is closed, and the green gate 48G opens so that green video signals are applied to the control grid 16, the red gate 48R remaining closed. The electron beam *e* then moves on to another red strip (FIGURE 2) and the cycle is repeated. As the electron beam moves from colour to colour on the phosphor screen the gating circuits operate under the control of the scanning beam to apply the appropriate colour channel signals to control grid 16 of the tube, and the modulation of the electron beam is always produced by the colour signal appropriate for the colour of the phosphor area which is being scanned at any given instant. Thus, while the line and frame scanning of this receiver is synchronised from the television transmitter in the usual way, there is no requirement in this system for the scanning of any particular colour elements of the phosphor screen to be maintained in synchronism with any characteristic of the transmitted signal. This leads to a substantial simplification of the receiver as compared with prior devices.

Monochrome and grey scale balance can be obtained by adjusting the relative luminance efficiencies of the phosphor strips, or by adjusting the relative amplitudes of the red, blue and green video signals obtained from the video amplifier 44.

Figure 3:
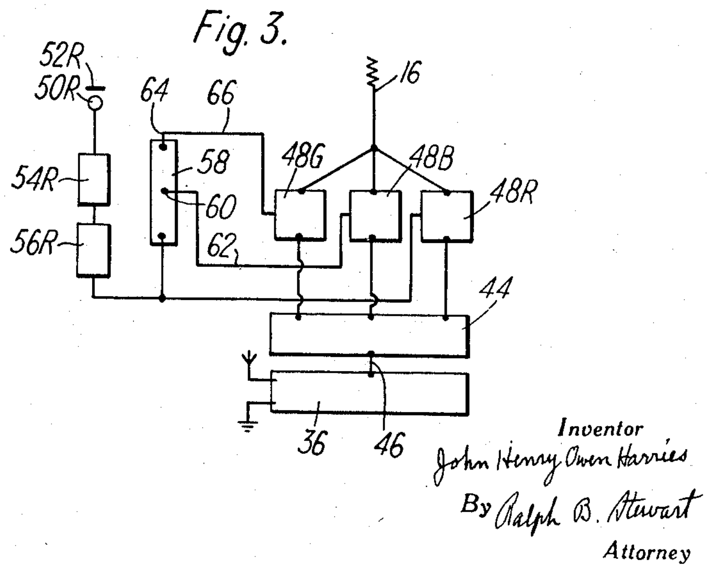
FIGURE 3 shows an alternative form of television receiving system embodying the invention.

FIGURE 3 shows an alternative to the circuits shown in FIGURE 1. As in FIGURE 1, a television receiver 36 feeds the video amplifier 44 through the link 46, and continuous red, blue and green video signals are supplied by this amplifier to the gates 48G, 48B and 48R so that these red, blue and green video signals can be successively applied to the modulator grid 16 as the gates 48G, 48B and 48R are opened one at a time in sequence. In FIGURE 3, however, a single photosensitive device 50R is exposed through the red colour filter 52R to the phosphor screen and receives red light from the red strips R of the phosphor screen. The resulting gating signal from the photosensitive device 50R travels through the amplifier 54R and the limiter circuit 56R (which clips the top and bottom of the signal) to the red gate 4R8. Thus the timing of the opening and closing of the gate 48R is accomplished as in FIGURE 1. The signal from the limiter circuit is also applied to a delay line 58. This delay line is tapped at 60 so that the gating signal derived from the photosensitive device 50R is delayed before it is applied by the link 62 to the blue gate 48B. This delay is substantially equal to the interval between the commencement of scanning of the red phosphor strip R by the electron beam and the commencement of scanning of the blue phosphor strip B (FIGURE 2). A terminal 64 at the end of the delay line is connected by the link 66 to the green gate 48G so that the gating signal derived from the photosensitive device 50R is further delayed before it is applied to the gate 48G. This further delay is equal to the interval between the commencement of scanning of the blue strip B of the phosphor screen and the commencement of scanning of the adjacent green strip G. Thus, the gating pulses for the green and blue video signals are supplied by delaying the gating pulses which are produced by the photosensitive device 50R when the electron beam passes over the red phosphor strips. In this way only a single photosensitive device need be used instead of the three photosensitive devices shown in FIGURE 1. Instead of using the gating pulse from the red phosphor the gating pulse from either the green or the blue phosphor can, of course, be used.

It will be appreciated that the invention can be applied not only to systems using the usual three primary colours, red, blue and green; but can be applied to two-colour systems and to the production of radar displays using different colours for different signals or objects.

Figure 4:
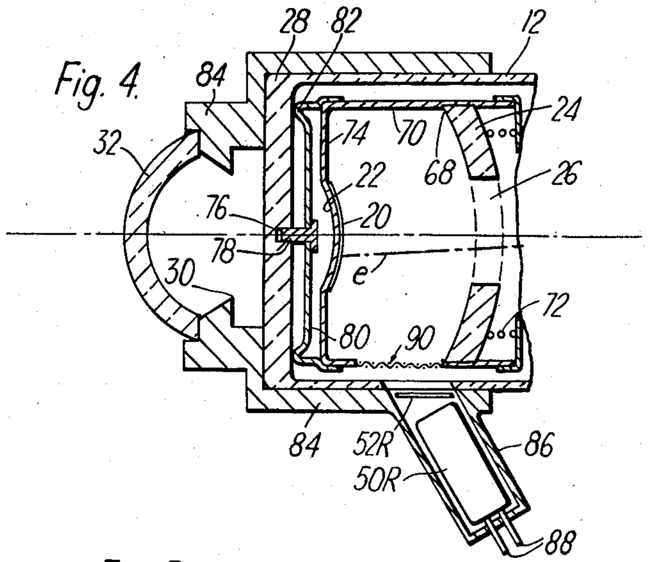
FIGURE 4 is a sectional view of part of a vacuum discharge tube incorporating a housing for a colour control photoelectric device.
Figure 5:
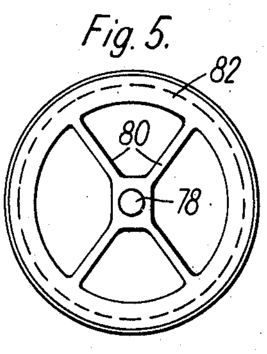
FIGURES 5, 6 and 7 represent details of the tube of FIGURE 4.
Figure 6:
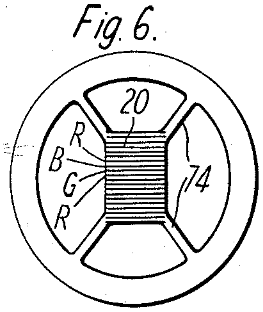
Figure 7:
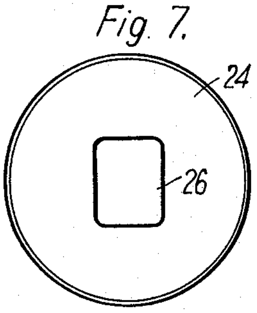

FIGURES 4, 5, 6 and 7 show in greater detail a part of the vacuum discharge tube and associated optical system together with one of the photosensitive devices. In FIGURE 4 part of a glass envelope 12 of a cathode ray tube suitable for use in FIGURES 1 and 3 is shown, the envelope having at the front end a glass window 28. The concave spherical mirror 24, which is also shown in axial view in FIGURE 7, is supported on a ledge 68 on the inside of a metal cylinder 70 and is retained in position by a helical spring 72. The mirror 24 may consist of glass with an aluminised reflective surface facing the phosphor screen, the remaining surfaces having a conductive coating which is in electrical contact with the aluminising at the edges of the mirror. The conductive coating is electrically connected to the cylinder 70 through the spring 72. The electron beam *e* travels to the phosphor 20 through the aperture 26 in the spherical mirror 24. The phosphor screen 20 is supported on a metal backing 22 which is of part-spherical form and which is connected to the metal cylinder 70 by means of spider arms 74 (see also the axial view of FIGURE 6) which are so arranged that the obstruction which they present to light rays passing through the system is as small as possible. The phosphor screen 20 is so positioned that it coincides over its entire area with the spherical object field of the spherical mirror. The distance between the spherical mirror and the phosphor screen is fixed during manufacture. The window 28 has a locating hole 76 on the optical axis of the system into which locating hole a metal pin 78 slides. The pin 78 is spot welded to a metal spider 80 (see also FIGURE 5) which also supports the cylinder 70 carrying the phosphor screen and spherical mirror and locates it in precise axial alignment with the face and edges of the window 28. The annular area 82 of the spider is in contact with the flat face of the window 28 and so keeps the assembly parallel to the axis of the tube. The locating hole 76 is sufficiently deep for the locating pin 78 not to touch the bottom of the hole. The pin 78, therefore, has the sole function of locating the assembly on the axis of the tube. The assembly is held and pressed against the window 28 by a spring fastening (not shown). This kind of assembly is described in greater detail in the co-pending patent application Ser. No. 780,421. An insulating casing or holder 84 is cemented to the envelope 12. It is shaped to form the optical stop 30 and carries a glass meniscus 32 which is cemented into position. The casing 84 has a tubular extension 86 which contains a photoelectric tube 50R and a red colour filter 52R. The extension 86 projects laterally from the casing 84 at a point in front of the plane of the screen 20, and is directed to pick up radiation from the screen 20 as shown in FIGURE 4. The signals from the photoelectric tube are led away through the conductors 88. The photoelectric tube 50R receives light from the phosphor 20 which passes through an aperture in the metal cylinder 70 and through the glass side wall of the envelope 12. The aperture in cylinder 70 is covered by a coarse wire mesh 90 in order to preserve a field-free region within the cylinder 70. The inside of the cylinder 70 and spider 80 are preferably coloured black, but reflecting areas may, if desired, be used to distribute or direct the light from the phosphor screen towards the photoelectric tube 50R. More than one such photoelectric tube and tubular extension 86 may be added to the casing 84, appropriately located apertures being formed in the cylinder 70. Thus, for example, for the purpose of FIGURE 1, three such photoelectric tubes are spaced around the casing 84 shown in FIGURE 4. More than one photoelectric tube sensitive to a given colour may also be used.

Figure 8:
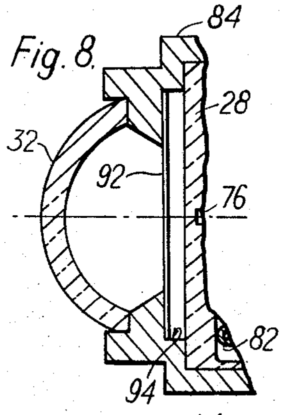
FIGURE 8 is a sectional view of part of a vacuum discharge tube for use when non-visible radiation from the phosphor screen is used to control the switching of the colour signals.

The invention has been exemplified above by embodiments in which the light radiated by the phosphor areas or strips and used for the production of gating pulses is in the visible part of the spectrum. Alternatively, phosphor strips may be used the emission of which includes radiation outside the visible range, together with corresponding photosensitive devices, with or without filters, which are sensitive to radiation outside the visible range but not to radiation within the visible range. A filter may then be included in the optical path between the viewing screen and the phosphor to reduce or eliminate the transmission of non-visible radiation of this kind without interfering appreciably with the visible radiation which produces the image at the viewing screen. The result of this is to reduce still further the effect of ambient illumination from the viewing screen on the photosensitive devices. FIGURE 8 shows the holder 84 of FIGURE 4 with the addition of such a filter 92, which removes light outside the visible range. The filter is cemented into the aperture 94. The system in general may be of the kinds shown in FIGURES 1 and 3 with appropriate filters and photosensitive devices used for the elements 52R, 52B, 52G, 50R, 50B and 50G. Alternatively, one or more of the phosphor strips (such as those shown in FIGURES 2 or 6) may be such as to radiate mainly in the non-visible part of the spectrum to excite corresponding photosensitive devices.

I claim:

1. Colour television receiving apparatus comprising means for producing electric signals representing colour components of a colour image, an electron discharge tube having means producing an electron beam, an electrode for modulating said beam, a target for said beam comprising a phosphor screen consisting of a plurality of elemental areas constituting different sets of areas coated respectively with phosphors adapted to radiate at different wavelengths, said phosphors having light-diffusing surfaces which diffuse light reflected therefrom, means to effect repeated deflection of said beam over said target, said apparatus further comprising radiation-sensitive means sensitive only over a limited spectral range, including the wavelength radiated by a given set of said phosphor-coated areas, to produce corresponding electric signals when such areas are scanned, means shielding said radiation-sensitive means to receive such radiation only from said phosphor screen and to exclude ambient light, switching means operating under the control of said electric signals and serving to switch said colour-component video signals one at a time to said modulation electrode as the phosphor areas representing corresponding colour components are scanned in turn by the electron beam, a diffusing screen located outside of said tube, and an optical projection system of the image magnifying type adapted to form on said diffusing screen a magnified image of the display on the phosphor screen, the magnification of said optical system being such that the effect of ambient radiation at said diffusing screen on said radiation-sensitive means after reflection from said phosphor screen is negligible.

2. Apparatus according to claim 1, including for each of the phosphors on said phosphor screen a separate radiation-sensitive means, the spectral sensitivity range of which includes the radiation produced by the corresponding phosphor, and including a plurality of switching means controlled by the signals from the plurality of radiation-sensitive means, respectively, each switching means operating in response to a signal from the corresponding radiation-sensitive means to apply a video signal modulated in accordance with the corresponding colour to the modulation electrode of said tube.

3. Apparatus according to claim 1, in which the number of radiation-sensitive means is less than the number of phosphors which make up said phosphor screen, and including delay switching means responsive to signals produced by a radiation-sensitive means, the spectral sensitivity range of which includes the radiation produced by one of said colour phosphors, in response to the scanning of the set of areas coated with that phosphor, and operating after a given time delay to apply video signals representing another colour component of the colour image to the modulation electrode of said tube.

4. Apparatus according to claim 1, in which said elemental areas of the phosphor screen are in the form of narrow strips extending across said target in parallel relation.

5. Apparaus according to claim 1, in which the modulation electrode of said tube is biased to ensure that the scanning electron beam is not completely cut off even in the absence of a video signal.

6. Apparatus according to claim 1, in which one of said phosphors on the phosphor screen radiates to an appreciable extent at a wavelength outside the visible range of the spectrum, the spectral sensitivity range of the corresponding radiation-sensitive means including this wavelength.

7. Apparatus according to claim 6, in which a radiation filter, adapted to reduce the transmission of non-visible radiation of a wavelength to which said radiation-sensitive means is sensitive, is positioned in the optical path of said projection system.

8. Apparatus according to claim 6, in which one of said phosphors radiates mainly in the non-visible part of the spectrum and does not assist in the production of a visible colour picture on said phosphor screen.

9. Colour television receiving apparatus comprising means for producing electric signals representing colour components of a colour image, and an electron discharge tube having means producing an electron beam, an electrode for modulating said beam, a target for said beam comprising a phosphor screen consisting of a plurality of elemental areas constituting different sets of areas coated respectively with phosphors adapted to radiate at different wavelengths, means to effect repeated deflection of said beam over said target, said phosphors having light-diffusing surfaces which diffuse light reflected therefrom, means to effect repeated deflection of said beam over said target, said apparatus further comprising radiation-sensitive means sensitive only over a limited spectral range, including the wavelength radiated by a given set of said phosphor-coated areas, to produce corresponding electric signals when such areas are scanned, means shielding said radiation-sensitive means to receive such radiation only from said phosphor screen and to exclude ambient light from directions other than by reflection from said phosphor screen, switching means operating under the control of said electric signals and serving to switch said colour-component video signals one at a time to said modulation electrode as the phosphor areas representing corresponding colour components are scanned in turn by the electron beam, a diffusing screen located outside of said tube, and an optical projection system adapted to form on said diffusing screen a magnified image of the display on the phosphor screen, said optical projection system including a concave mirror located within the vacuum envelope of said tube and arranged to receive light from that side of said phosphor screen which is scanned by the electron beam, said concave mirror being so arranged that light rays from an image on said phosphor screen are reflected by said concave mirror and emerge through a transparent face of said vacuum envelope, the magnification of said optical system being such that the effect of ambient radiation at said diffusing screen on said radiation-sensitive means after reflection from said phosphor screen is negligible.

10. Colour television display apparatus comprising an electron beam tube having a phosphor screen consisting of a plurality of elemental areas constituting different sets of areas coated respectively with phosphors adapted to radiate at different wavelengths, said phosphors having light-diffusing surfaces which diffuse light reflected therefrom, and an optical projection system located within said tube and adapted to project to the outside of said tube a magnified image of the display on said phosphor screen, said tube having formed in its walls a housing for a radiation-sensitive device having a limited range of spectral response, said housing being so arranged that a radiation-sensitive device placed therein is exposed to radiation from said phosphor screen and is shielded against ambient light except by reflection from said diffusing surfaces of said phosphors.

11. Colour television display apparatus comprising an electron beam tube having a vacuum envelope within which is a phosphor screen consisting of a plurality of elemental areas constituting different sets of areas coated respectively with phosphors adapted to radiate at different wavelengths, said phosphors having light-diffusing surfaces which diffuse light reflected therefrom, and an optical projection system of the image magnifying type including a concave mirror located within said vacuum envelope and arranged to receive light from that side of said phosphor screen which is scanned by the electron beam, said concave mirror being so arranged that light rays from an image on the phosphor screen are reflected by said concave mirror and emerge through a transparent face of said vacuum envelope, said vacuum envelope having formed in its walls a housing for a radiation-sensitive device, said housing being arranged so that said radiation-sensitive device is exposed to radiation from said phosphor screen and is shielded against ambient light except by reflection from said diffusing surfaces of said phosphors.

12. Colour television receiving apparatus comprising means for producing electric signals representing colour components of a colour image and an electron discharge tube having means producing an electron beam, an electrode for modulating said beam, a target for said beam comprising a phosphor screen consisting of a plurality of elemental areas constituting different sets of areas coated respectively with phosphors adapted to radiate at different wavelengths, said phosphors having light-diffusing surfaces which diffuse light reflected therefrom, one of the phosphors being adapted to radiate at a non-visible wavelength, means to effect repeated deflection of said beam over said target, said apparatus further comprising means responsive to the radiation at said non-visible wavelength from the corresponding electrical signals when such areas are scanned, means shielding said radiation-responsive means to receive such radiation only from said phosphor screen and to exclude ambient light, switching means operating under the control of said electric signals and serving to switch said colour-component video signals one at a time to said modulation electrode as the phosphor areas representing corresponding colour components are scanned in turn by the electron beam, a diffusing screen located outside of said tube, an optical projection system adapted to form on said diffusing screen a magnified image of the display on said phosphor screen, and a filter located in the optical path of said projection system and adapted to reduce the transmission of non-visible radiation of the said wavelength from said diffusing screen to said phosphor screen.

References Cited in the file of this patent

UNITED STATES PATENTS

| | | |
|---|---|---|
| 2,657,257 | Lesti | Oct. 27, 1953 |
| 2,887,528 | Rhodes | May 19, 1959 |
| 2,899,490 | Cheetham et al. | Aug. 11, 1959 |

OTHER REFERENCES

RCA Technical Notes, RCA TN No. 210 "Indexing Signal Pickup Arrangement for Line Screen Television," January 5, 1959.